US009112204B2

(12) United States Patent
Bang et al.

(10) Patent No.: US 9,112,204 B2
(45) Date of Patent: *Aug. 18, 2015

(54) PACK CASE OF NOVEL STRUCTURE

(75) Inventors: Seunghyun Bang, Chungcheongbuk-do (KR); Soo Ryoung Kim, Chungcheongbuk-do (KR); Young Sun Park, Cheongju-si (KR); Chun Yeon Kim, Chungcheongbuk-do (KR); Ho Sang Kwon, Cheongju-si (KR)

(73) Assignee: LG Chem, Ltd., Seoul (KR)

( * ) Notice: Subject to any disclaimer, the term of this patent is extended or adjusted under 35 U.S.C. 154(b) by 218 days.

This patent is subject to a terminal disclaimer.

(21) Appl. No.: 13/809,016

(22) PCT Filed: Jul. 13, 2011

(86) PCT No.: PCT/KR2011/005140
§ 371 (c)(1),
(2), (4) Date: Mar. 14, 2013

(87) PCT Pub. No.: WO2012/008745
PCT Pub. Date: Jan. 19, 2012

(65) Prior Publication Data
US 2013/0164570 A1    Jun. 27, 2013

(30) Foreign Application Priority Data
Jul. 16, 2010   (KR) .................. 10-2010-0068966

(51) Int. Cl.
*H01M 2/02* (2006.01)
*H01M 2/04* (2006.01)
(Continued)

(52) U.S. Cl.
CPC ............ *H01M 2/1061* (2013.01); *H01M 2/204* (2013.01); *H01M 2/34* (2013.01); *H01M 10/425* (2013.01); *H01M 10/4257* (2013.01); *H01M 2010/4278* (2013.01)

(58) Field of Classification Search
USPC ............... 429/7, 96–100, 149–160, 163–187
See application file for complete search history.

(56) References Cited

U.S. PATENT DOCUMENTS

2003/0121142 A1   7/2003   Kikuchi et al.
2003/0146734 A1   8/2003   Kozu et al.
(Continued)

FOREIGN PATENT DOCUMENTS

CN    102668226 A    9/2012
JP    2000-90907 A   3/2000
(Continued)

OTHER PUBLICATIONS

Machine Translation of Suzuki et al. (JP 2005-123127, published May 2005, pp. 1-13).*

(Continued)

*Primary Examiner* — Basia Ridley
*Assistant Examiner* — Caitlin Wilmot
(74) *Attorney, Agent, or Firm* — Birch, Stewart, Kolasch & Birch, LLP (57) ABSTRACT

Disclosed herein is a pack case for battery packs in which a battery cell array including two or more battery cells arranged in a lateral direction and a protection circuit module (PCM) including a protection circuit to control an operation of the battery pack are mounted, the pack case including a lower case, on which the battery cell array and the protection circuit module are mounted, and an upper case disposed above the lower case so that the upper case covers the lower case to fix the battery cell array and the protection circuit module in place, wherein a lower case is partitioned into a battery cell mounting part, on which the battery cells are mounted, and a protection circuit module mounting part, on which the protection circuit module is mounted, a partition wall is formed at an interface between the battery cell mounting part and the protection circuit module mounting part, and openings, through which electrode terminals of the battery cells are exposed toward the protection circuit module, are formed at portions of the partition wall corresponding to electrical connection regions between the electrode terminals of the battery cells and the protection circuit module.

8 Claims, 9 Drawing Sheets

(51) Int. Cl.
  *H01M 2/06* (2006.01)
  *H01M 2/10* (2006.01)
  *H01M 2/24* (2006.01)
  *H01M 10/42* (2006.01)
  *H01M 2/34* (2006.01)
  *H01M 2/20* (2006.01)

(56) References Cited

U.S. PATENT DOCUMENTS

| | | |
|---|---|---|
| 2006/0159987 A1 | 7/2006 | Kikuchi et al. |
| 2007/0188132 A1 | 8/2007 | Kim et al. |
| 2010/0047676 A1 | 2/2010 | Park et al. |
| 2010/0151299 A1 | 6/2010 | Ha et al. |
| 2012/0257349 A1 | 10/2012 | Bang et al. |
| 2012/0300396 A1* | 11/2012 | Bang et al. ............... 361/679.55 |

FOREIGN PATENT DOCUMENTS

| | | | |
|---|---|---|---|
| JP | 2000-182581 | A | 6/2000 |
| JP | 2001-256937 | A | 9/2001 |
| JP | 2001-266820 | A | 9/2001 |
| JP | 2002-110115 | A | 4/2002 |
| JP | 2002-141051 | A | 5/2002 |
| JP | 2003-019569 | * | 1/2003 |
| JP | 2005-123127 | * | 5/2005 |
| JP | 2007-323909 | A | 12/2007 |
| JP | 2009-512981 | A | 3/2009 |
| JP | 2010-500721 | A | 1/2010 |
| KR | 10-2008-0025429 | A | 3/2008 |
| KR | 10-2009-0118197 | A | 11/2009 |

OTHER PUBLICATIONS

Machine Transition of Kubota (JP 2003-019569, published Jan. 2003, pp. 1-12).*

International Search Report issued in PCT/KR2011/005140, mailed on Jan. 9, 2012.

* cited by examiner

PACK CASE OF NOVEL STRUCTURE

TECHNICAL FIELD

The present invention relates to a pack case of a novel structure, and more particularly to a pack case for battery packs in which a battery cell array including two or more battery cells arranged in a lateral direction and a protection circuit module (PCM) including a protection circuit to control an operation of the battery pack are mounted, the pack case including a lower case, on which the battery cell array and the protection circuit module are mounted, and an upper case disposed above the lower case so that the upper case covers the lower case to fix the battery cell array and the protection circuit module in place, wherein a lower case is partitioned into a battery cell mounting part, on which the battery cells are mounted, and a protection circuit module mounting part, on which the protection circuit module is mounted, a partition wall is formed at an interface between the battery cell mounting part and the protection circuit module mounting part, and openings, through which electrode terminals of the battery cells are exposed toward the protection circuit module, are formed at portions of the partition wall corresponding to electrical connection regions between the electrode terminals of the battery cells and the protection circuit module.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

However, various kinds of combustible materials are contained in the lithium secondary battery. As a result, the lithium secondary battery may be heated or explode due to the overcharge of the battery, the overcurrent in the battery, or external physical impact. That is, the safety of the lithium secondary battery is very low. Consequently, safety elements, such as a positive temperature coefficient (PTC) element and a protection circuit module (PCM), to effectively control an abnormal state of the lithium secondary battery, such as the overcharge of the lithium secondary battery or the overcurrent in the lithium secondary battery, are mounted to a battery cell in a state in which the safety elements are connected to the battery cell.

The lithium secondary battery has been used in various applications. Typically, the lithium secondary battery is used as a power source of a laptop computer. A battery pack mounted in a laptop computer requires high power and large capacity. To this end, a conventional cylindrical battery pack including a plurality of cylindrical battery cells has generally been used. In recent years, however, the size of a laptop computer has been reduced, and therefore, there is a high necessity for a slim type battery pack.

Therefore, there is a high necessity for a pack case in which pouch-shaped battery cells are used to manufacture a slim type battery pack, thereby increasing capacity of the battery pack, simplifying a manufacturing process of the battery pack, and minimizing the total size of the battery pack.

Also, a short circuit may occur due to contact between electrode terminals of the battery cells and components of the protection circuit module or flow of electrolyte leaking from one or more of the battery cells to the protection circuit module. Therefore, there is a high necessity for a pack case configured to have a structure that is capable of solving the above problems.

DISCLOSURE

Technical Problem

Therefore, the present invention has been made to solve the above problems, and other technical problems that have yet to be resolved.

Specifically, it is an object of the present invention to provide a pack case which includes two or more battery cells to exhibit high power or large capacity, which is manufactured using a simple and easy manufacturing process, thereby reducing manufacturing cost of the battery case, and which has a compact structure.

Technical Solution

In accordance with one aspect of the present invention, the above and other objects can be accomplished by the provision of a pack case for battery packs in which a battery cell array including two or more battery cells arranged in a lateral direction and a protection circuit module (PCM) including a protection circuit to control an operation of the battery pack are mounted, the pack case including a lower case, on which the battery cell array and the protection circuit module are mounted, and an upper case disposed above the lower case so that the upper case covers the lower case to fix the battery cell array and the protection circuit module in place, wherein a lower case is partitioned into a battery cell mounting part, on which the battery cells are mounted, and a protection circuit module mounting part, on which the protection circuit module is mounted, a partition wall is formed at an interface between the battery cell mounting part and the protection circuit module mounting part, and openings, through which electrode terminals of the battery cells are exposed toward the protection circuit module, are formed at portions of the partition wall corresponding to electrical connection regions between the electrode terminals of the battery cells and the protection circuit module.

In the pack case according to the present invention, therefore, it is possible to restrain contact between the electrode terminals of the battery cells and components of the protection circuit module since the partition wall is formed at the interface between the battery cell mounting part and the protection circuit module mounting part. Also, even when an electrolyte leaks from one or more of the battery cells, the electrolyte is prevented from flowing to the protection circuit module, thereby preventing the occurrence of a short circuit.

Also, since the openings, through which the electrode terminals of the battery cells are exposed toward the protection circuit module, are formed at portions of the partition wall corresponding to the electrical connection regions between the electrode terminals of the battery cells and the protection circuit module, it is possible to easily weld the electrode terminals of the battery cells, which are exposed through the openings, to connection terminals of the protection circuit module.

The height of the partition wall may be sufficient to fully isolate the battery cell mounting part and the protection circuit module mounting part from each other.

According to circumstances, the protection circuit module mounting part may be configured to have a structure having an external input and output terminal mounting part, in which an external input and output terminal to input electric current to the battery pack, to output electric current from the battery pack, and to transmit and receive information to and from the battery pack is mounted.

In a preferred example of the structure, an external input and output terminal opening having a size corresponding to the external input and output terminal may be formed at a portion of a front of the upper case so that the external input and output terminal is exposed upward. Consequently, power from the battery pack can be easily supplied to an external device through the external input and output terminal.

The protection circuit module mounting part may be configured to have a structure including a support part to support the electrical connection region between each of the electrode terminals of the battery cells and the protection circuit module.

The shape of the support part is not particularly restricted so long as the support part can easily support the electrical connection region between each of the electrode terminals of the battery cells and the protection circuit module. For example, the support part may be formed on the lower case in the shape of an upward protrusion.

Specifically, when each of the electrode terminals of the battery cells and a corresponding one of the connection terminals of the protection circuit module are coupled to each other by resistance welding, the protection circuit module may not endure pressure of a resistance welding rod if the support part is not formed on the lower case in the shape of an upward protrusion with the result that the protection circuit module may be bent. In this case, therefore, it is necessary to couple the connection terminal of the protection circuit module and the anode terminal of each of the battery cells to each other using a resistance welding jig and to mount the connection terminal of the protection circuit module and the anode terminal of each of the battery cells, which are coupled to each other by resistance welding, on the lower case. As a result, the number of processes is increased.

According to the present invention, on the other hand, the lower case includes a support part formed in the shape of an upward protrusion, and the support part endures pressure of the resistance welding rod generated when each of the electrode terminals of the battery cells and a corresponding one of the connection terminals of the protection circuit module are coupled to each other by resistance welding. Consequently, the battery cells and the protection circuit module are mounted on the lower case, and then the anode terminal of each of the battery cells and a corresponding one of the connection terminals of the protection circuit module are directly coupled to each other by resistance welding, thereby solving the above problem.

In a preferred example, the support part may be formed in the shape of a cross type protrusion, a straight protrusion, two parallel protrusions, or a cylindrical boss type protrusion. Consequently, it is possible for the support parts to more stably support the electrical connection regions between the electrode terminals of the battery cells and the protection circuit module during resistance welding between the electrode terminals of the battery cells and the protection circuit module.

In accordance with another aspect of the present invention, there is provided a battery pack including the pack case with the above-stated construction, a battery cell array including two or more battery cells arranged in a lateral direction, and a protection circuit module (PCM) including a protection circuit to control an operation of the battery pack.

Specifically, the battery pack is configured such that an electrical connection region between a cathode terminal of each of the battery cells and the protection circuit module is welded to have a structure in which a conductive plate attached to each connection terminal of the protection circuit module surrounds the cathode terminal of each of the battery cells.

In the battery pack according to the present invention, therefore, the battery cells are arranged in the lateral direction based on desired capacity of the battery pack, the connection terminals of the protection circuit module and the electrode terminals of the battery cells are directly connected to each other with high welding coupling force via conductive plates, which are configured to have a specific structure, and the battery cells are electrically connected in series and/or in parallel to each other via metal plates included in the protection circuit module. Consequently, it is possible to easily manufacture a large capacity or high power battery pack through the use of a simple method.

In a concrete example, the conductive plates may be attached to the connection terminals of the protection circuit module so that the conductive plates can be bent, the conductive plates may be bent in a bracket shape in a state in which the cathode terminals of the battery cells are placed on the conductive plates, and resistance welding may be carried out from above the bent portions of the conductive plates, thereby achieving physical coupling and electrical connection between the connection terminals of the protection circuit module and the cathode terminals of the battery cells.

The shape of the conductive plates is not particularly restricted so long as the conductive plates can be easily bent. For example, the conductive plates may be formed in an L shape in a state in which the conductive plates are attached to the corresponding connection terminals of the protection circuit module.

In a preferred example, each of the conductive plates may include a first connection part attached to the top of a corresponding one of the connection terminals of the protection circuit module and a second connection part attached to the top of the cathode terminal of a corresponding one of the battery cells. Consequently, the connection between the cathode terminals of the battery cells and the connection terminals of the protection circuit module is more securely achieved. In addition, when external force is applied to the battery pack, deformation of the electrical connection regions between the cathode terminals of the battery cells and the protection circuit module is prevented.

The material composing each of the conductive plates is not particularly restricted so long as the conductive plates can provide high coupling force when the conductive plates are welded as described above. For example, each of the conductive plates may be a nickel plate, and each of the cathode terminals of the battery cells may be an aluminum terminal.

Consequently, electric current from a resistance welding rod during resistance welding between the nickel plate and the aluminum terminal flows from the nickel plate, resistance of which is high, to the aluminum terminal, resistance of which is low, with the result that the resistance welding between the nickel plate and the aluminum terminal is easily achieved.

Meanwhile, the protection circuit module may be configured to have a structure including connection terminals connected to the electrode terminals of the battery cells by resistance welding, metal plates to electrically connect the battery cells to each other, and a protection circuit to control the operation of the battery pack.

In a preferred example of the structure, the metal plates to electrically connect the battery cells to each other may be formed at the top of the protection circuit module. In this structure, it is possible to easily manufacture the PCM and to easily assemble the battery pack as compared with a structure in which metal wires are formed at a layer in the protection circuit of the PCM so as to electrically connect battery cells to each other.

For example, in a case in which a battery pack is constituted by three battery cells, the battery cells are arranged in the lateral direction to constitute a battery cell array, the battery cell array and a protection circuit module are mounted in a pack case, and electrode terminals of the battery cells and connection terminals of the protection circuit module are connected to each other by resistance welding, thereby manufacturing a desired battery pack.

Also, for a battery pack requiring high power, the metal plates included in the protection circuit module are connected in series to each other in a state in which the electrode terminals of the battery cell array are welded to the connection terminals of the protection circuit module. On the other hand, for a battery pack requiring long-term use, the metal plates included in the protection circuit module are connected in parallel to each other in a state in which the electrode terminals of the battery cell array are welded to the connection terminals of the protection circuit module. Consequently, it is possible to selectively manufacture a desired battery pack based on needs and uses thereof.

In accordance with a further aspect of the present invention, there is provided a laptop computer including the battery pack with the above-stated construction as a power source.

However, the battery pack according to the present invention may be manufactured so as to provide power and capacity required by a device by varying the number of battery cells constituting the battery pack. Of course, therefore, the battery pack according to the present invention can be applied to various devices requiring a variable battery capacity in addition to the laptop computer.

Advantageous Effects

As is apparent from the above description, a pack case according to the present invention is configured such that two or more battery cells to exhibit high power or large capacity are mounted in the pack case and welding between electrode terminals of the battery cells and a protection circuit module is easily achieved. Furthermore, it is possible to configure the pack case so as to have a compact structure.

Also, the battery pack is configured such that an electrical connection region between a cathode terminal of each of the battery cells and the protection circuit module is welded to have a structure in which a conductive plate attached to each connection terminal of the protection circuit module surrounds the cathode terminal of each of the battery cells. Consequently, it is possible to manufacture a battery pack exhibiting high weldability and having a compact structure.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
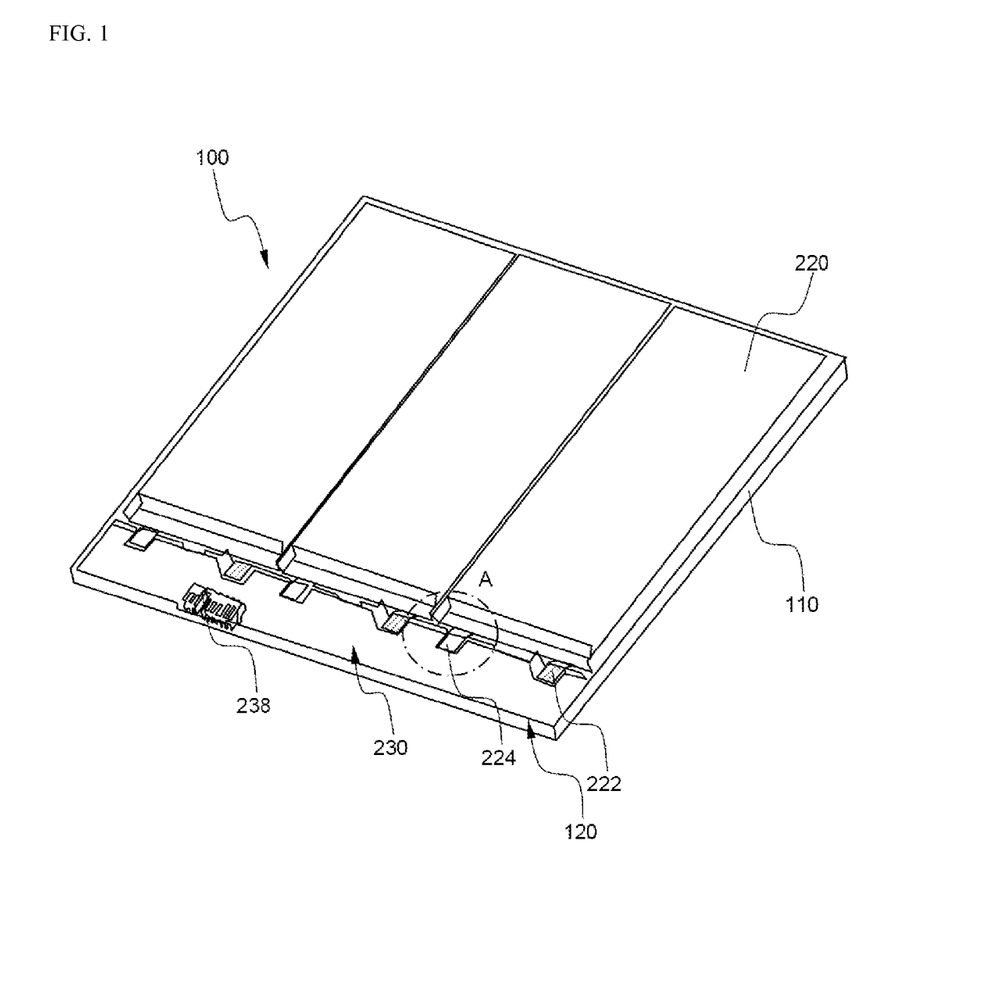
FIG. 1 is a perspective view showing a structure in which a battery cell array and a protection circuit module are mounted to a lower case.
Figure 2:
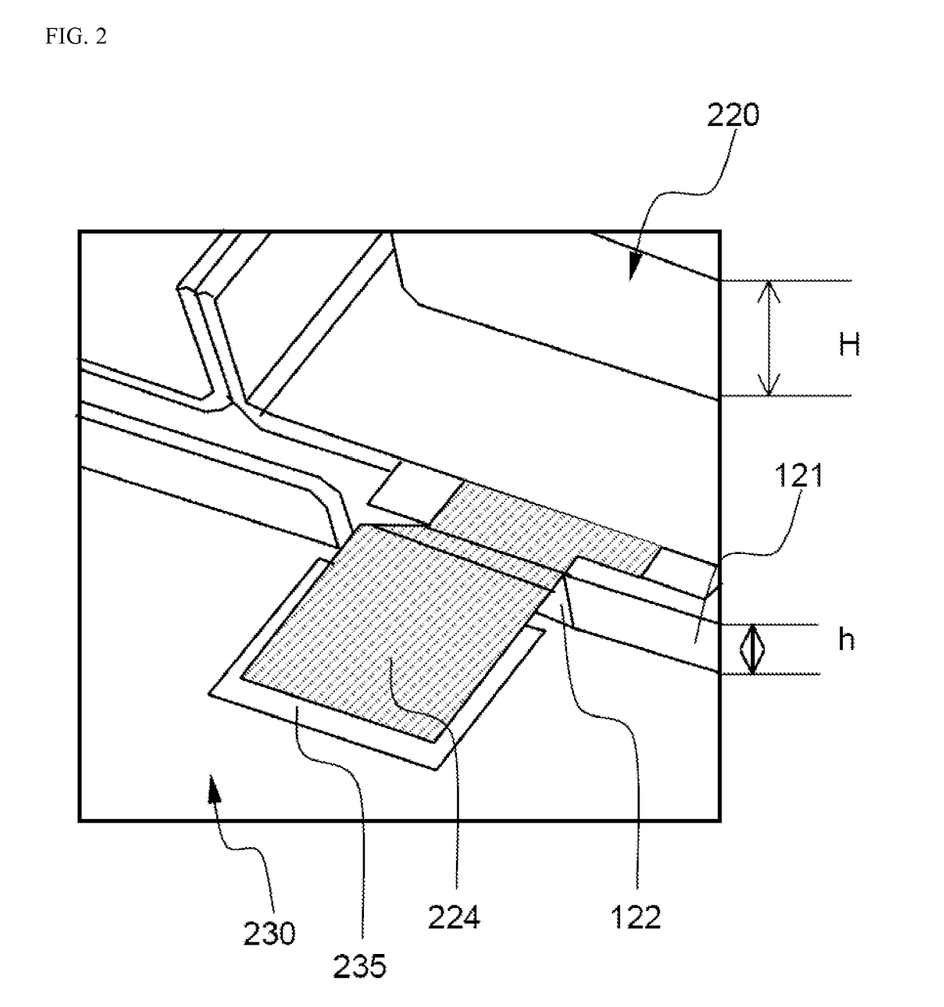
FIG. 2 is an enlarged typical view showing a region A of FIG. 1.

FIG. 1 is a perspective view typically showing a structure in which a battery cell array and a protection circuit module are mounted to a lower case, and FIG. 2 is an enlarged typical view showing a region A of FIG. 1.

Referring to these drawings, a lower case 100 is partitioned into a battery cell mounting part 110, on which battery cells 220 are mounted, and a protection circuit module mounting part 120, on which a protection circuit module 230 is mounted.

A partition wall 121 is formed at the interface between the battery cell mounting part 110 and the protection circuit module mounting part 120. Openings 122, through which electrode terminals 222 and 224 of the battery cells 220 are exposed toward the protection circuit module 230, are formed at portions of the partition wall 121 corresponding to electrical connection regions between the electrode terminals 222 and 224 of the battery cells 220 and the protection circuit module 230.

The partition wall 121 has a height h sufficient to fully isolate the battery cell mounting part 110 and the protection circuit module 230 from each other. According to circumstances, a corresponding partition wall may be formed at an upper case 300 (see FIG. 8) so as to achieve the above-mentioned isolation.

Figure 3:
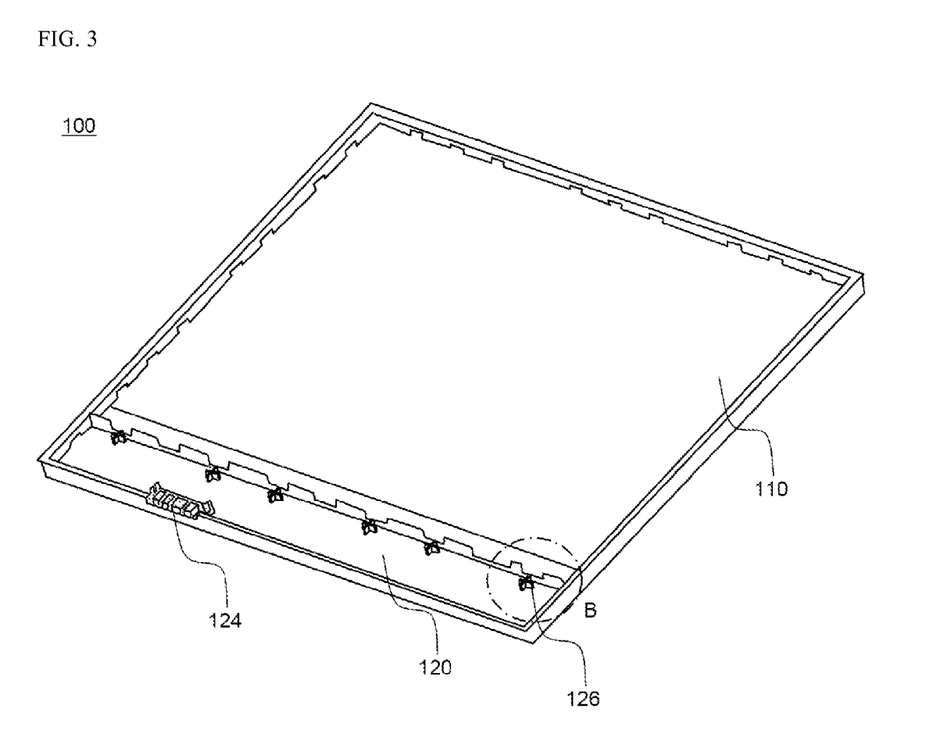
FIG. 3 is a perspective view showing the lower case of FIG. 1.
Figure 4:
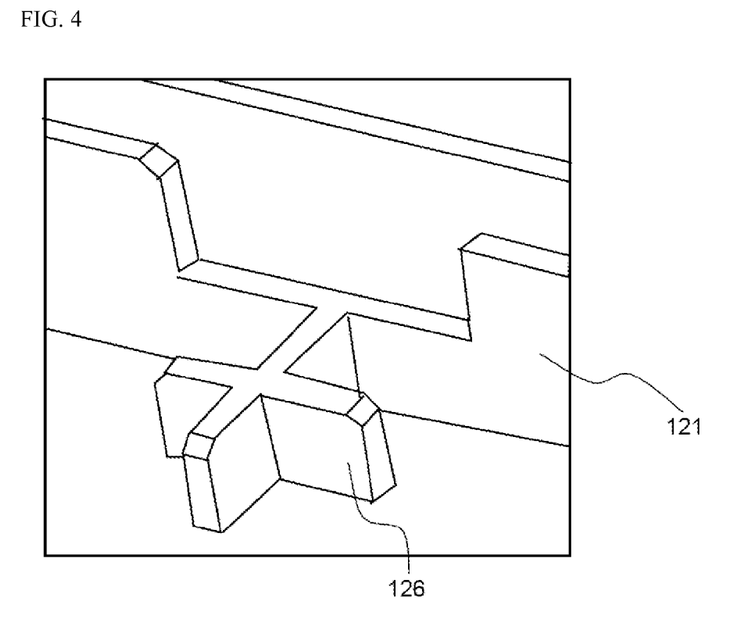
FIG. 4 is an enlarged typical view showing a region B of FIG. 3.

FIG. 3 is a perspective view typically showing the lower case of FIG. 1, and FIG. 4 is an enlarged typical view showing a region B of FIG. 3.

Referring to these drawings together with FIGS. 1 and 2, an external input and output terminal mounting part 124, in which an external input and output terminal 238 to input electric current to a battery pack, to output electric current from the battery pack, and to transmit and receive information to and from the battery pack is mounted, is formed at the protection circuit module mounting part 120 of the lower case 100.

Also, a support part 126 to support the electrical connection region between each of the electrode terminals 222 and 224 of the battery cells 220 and the protection circuit module 230 is formed on the lower case 100 in the shape of a cross type protrusion in plan in a state in which the support part 126 is connected to the partition wall 121. The support part 126 appropriately supports downward pressure applied by a welding tip (not shown) to be located above the cathode terminal 222 of each of the battery cells 220 (specifically, to be located above a bent portion, i.e. a second connection part 236 (see FIG. 11), of a conductive plate 239 (see FIG. 11)) during resistance welding, thereby providing high welding force.

Figure 5:
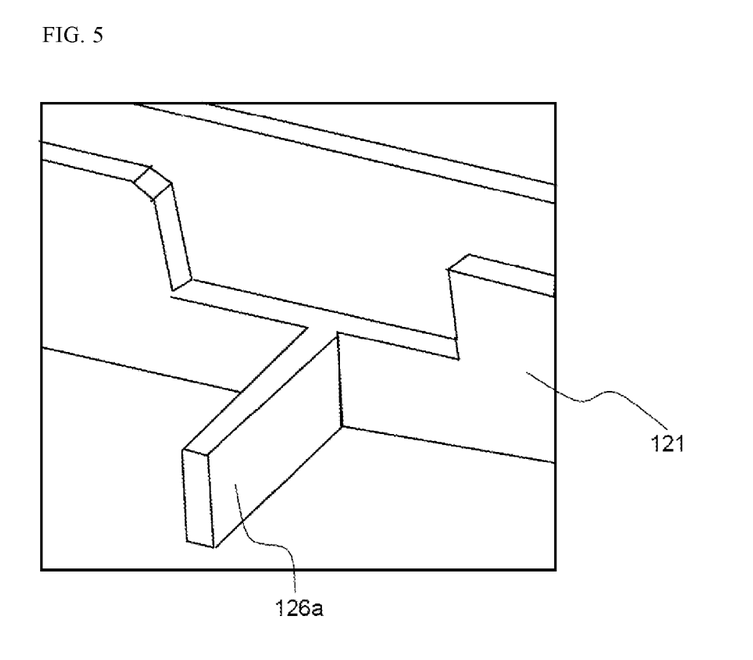
FIGS. 5 to 7 are typical views showing support parts according to other embodiments of the present invention.
Figure 6:
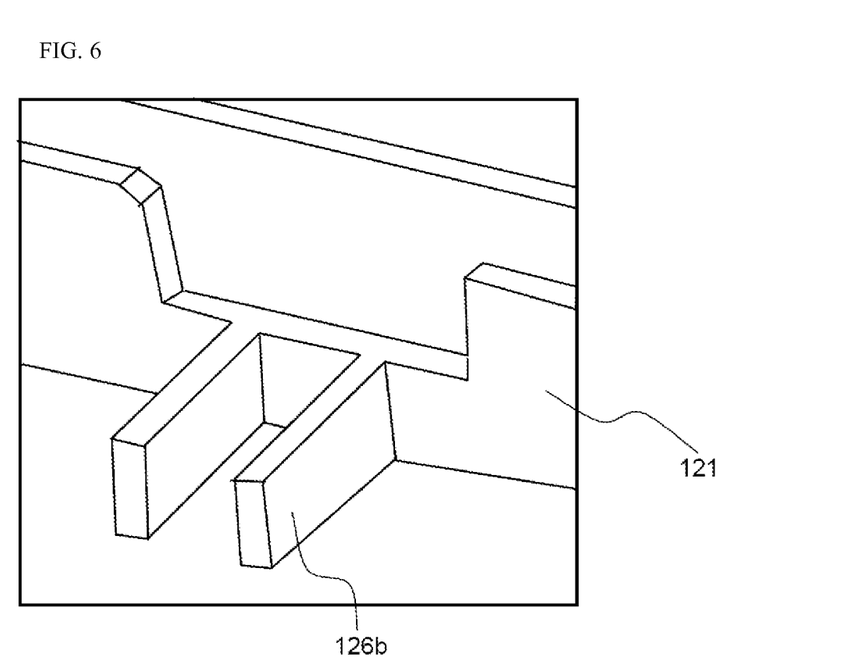
Figure 7:
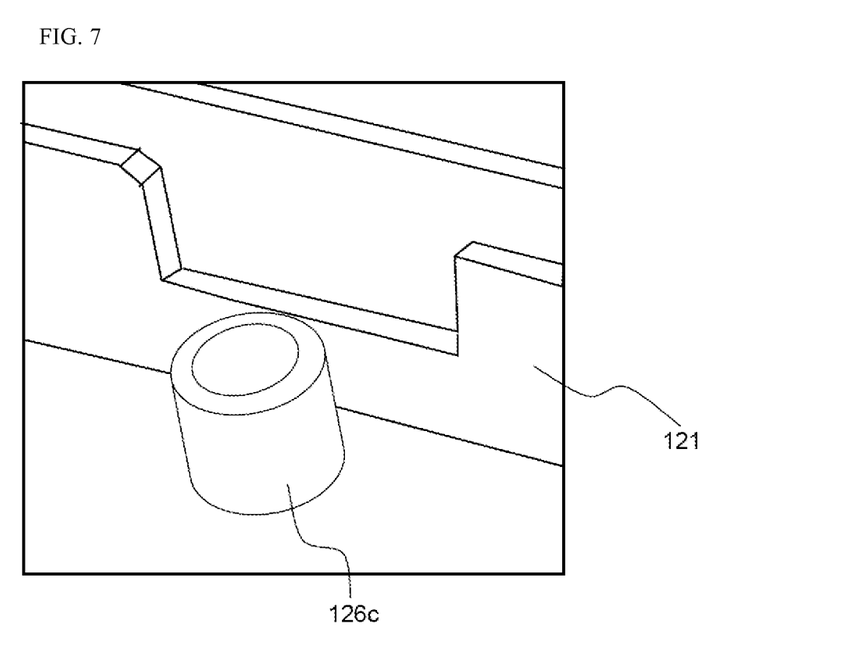

FIGS. 5 to 7 are typical views showing support parts according to other embodiments of the present invention.

Referring to these drawings, a support part 126a of FIG. 5, a support part 126b of FIG. 6, and a support part 126c of FIG. 7 are identical to the support part 126 of FIG. 4 except that the support part 126a of FIG. 5 is formed in the shape of a straight protrusion in plan, the support part 126b of FIG. 6 is formed in the shape of two parallel protrusions in plan, and the support part 126c of FIG. 7 is formed in the shape of a cylindrical boss type protrusion in plan, and therefore, a detailed description thereof will be omitted.

Figure 8:
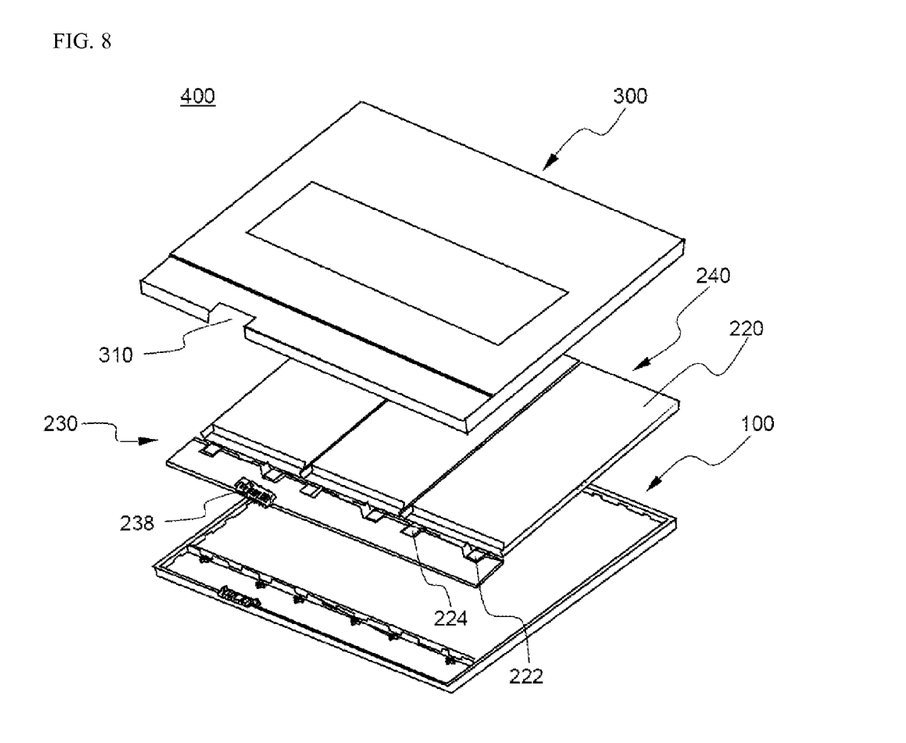
FIGS. 8 and 9 are an exploded view and perspective view showing a battery pack according to an embodiment of the present invention.
Figure 9:
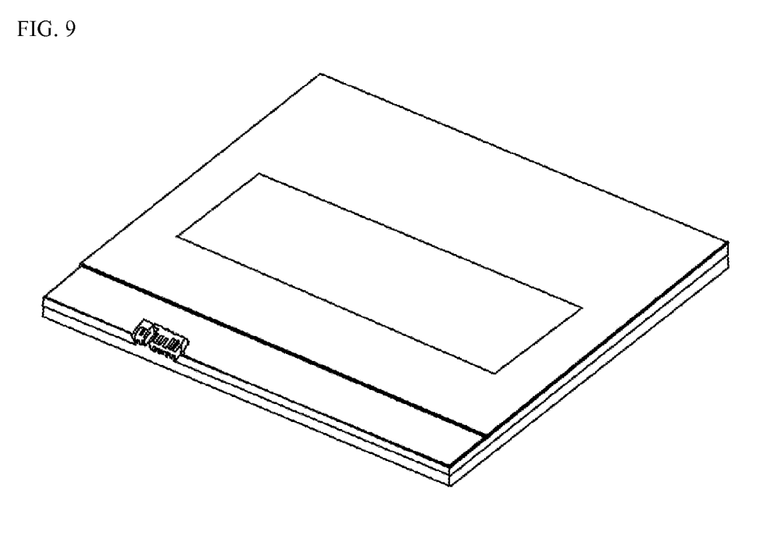

FIGS. 8 and 9 are an exploded view and perspective view typically showing a battery pack according to an embodiment of the present invention.

Referring to these drawings, a pack case include a lower case 100, on which a battery cell array 240 and a protection circuit module 230 are mounted, and an upper case 300 disposed above the lower case 100 so that the upper case 300 covers the lower case 100 to fix the battery cell array 240 and the protection circuit module 230 in place.

Also, an external input and output terminal opening 310 having a size corresponding to an external input and output terminal 238 is formed at the front of the upper case 300 so that only the external input and output terminal 238 can be exposed from a battery pack 400.

Figure 10:
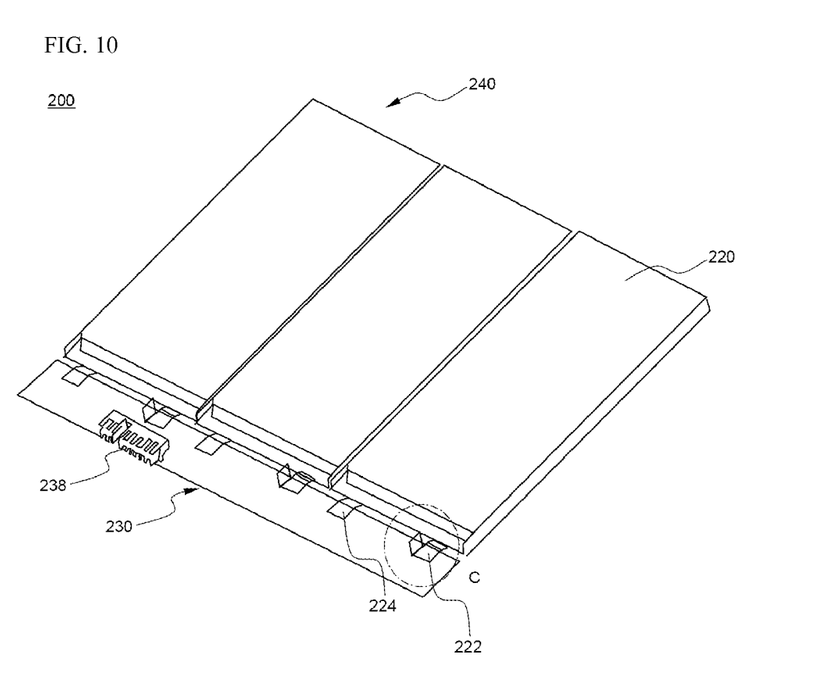
FIG. 10 is a perspective view showing a structure in which pouch-shaped battery cells according to another embodiment of the present invention are electrically connected to each other.
Figure 11:
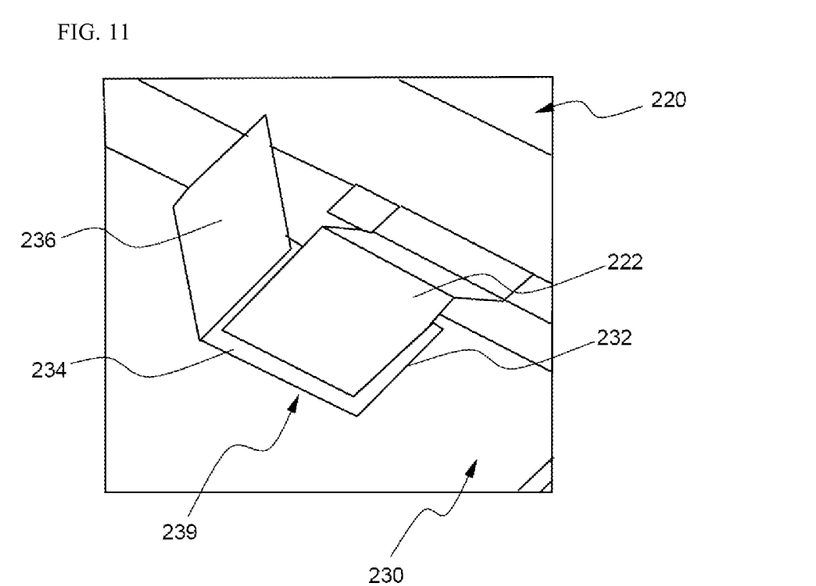
FIG. 11 is an enlarged typical view showing a region C of FIG. 10.
Figure 12:
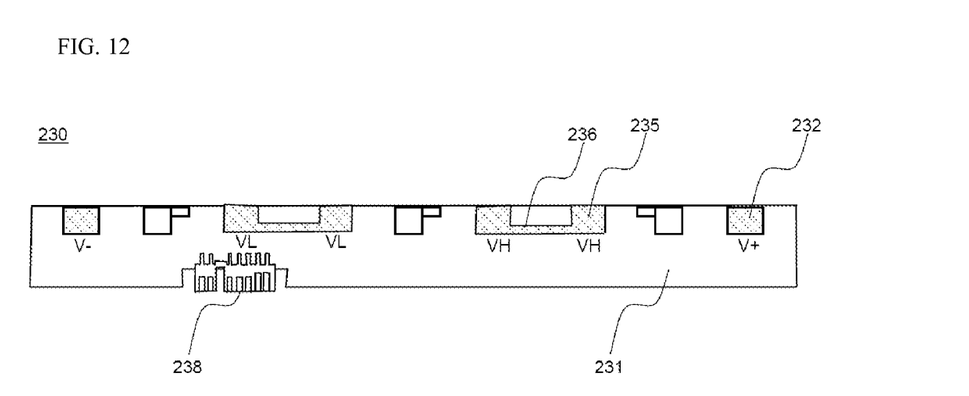
FIG. 12 is an enlarged plan view typically showing a protection circuit module of FIG. 10.

FIG. 10 is a perspective view typically showing a structure in which pouch-shaped battery cells according to another embodiment of the present invention are electrically connected to each other, FIG. 11 is an enlarged typical view showing a region C of FIG. 10, and FIG. 12 is an enlarged plan view typically showing a protection circuit module of FIG. 10.

Referring to these drawings together with FIG. 8, a battery pack 400 includes a battery cell array 240 including three battery cells 220 arranged in the lateral direction, a protection circuit module 230 connected to the upper end of the battery cell array 240, and a lower case 100 and an upper case 300 in which the battery cell array 240 and the protection circuit module 230 are mounted.

Each of the battery cells 220 is a pouch-shaped secondary battery cell configured so that an electrode assembly having a cathode/separator/anode structure is disposed in a battery case together with an electrolyte in a sealed state.

An electrical connection region C between the cathode terminal 222 of each of the battery cells 220 and the protection circuit module 230 is configured to have a structure in which a conductive plate 239 attached to each connection terminal 232 of the protection circuit module 230 surrounds the cathode terminal 222 of each of the battery cells 220.

Also, the conductive plate 239, which may be a nickel plate, includes a first connection part 234 attached to each connection terminal 232 of the protection circuit module 230 and a second connection part 236 attached to the top of the cathode terminal, which may be an aluminum terminal, of the corresponding battery cell 220.

Specifically, the conductive plate 239 is attached to the top of the corresponding connection terminal 23 of the protection circuit module 230 in an L shape. The conductive plate 239 is bent in a bracket shape in a state in which the cathode terminal 222 of the corresponding battery cell 220 is placed at the top of the first connection part 234 of the conductive plate 239, and then resistance welding is carried out from above the second connection part 236, which is a bent portion, of the conductive plate 239.

Meanwhile, referring to FIG. 12, the protection circuit module 230 includes a PCM main body 231 having a protection circuit to control overcharge, overdischarge, and overcurrent, connection terminals 232 and 235 formed at positions of the PCM main body 401 corresponding to the electrode terminals 222 and 224 of the battery cells 220 so as to directly electrically connect the battery cells 220 to each other, metal plates 236 formed at the top of the PCM main body 401 to electrically connect the connection terminals 232 and 235 to each other, and an external input and output terminal 238 mounted at the front of the PCM main body 401 in a depressed form to input electric current to the battery pack, to output electric current from the battery pack, and to transmit and receive information to and from the battery pack.

Figure 13:
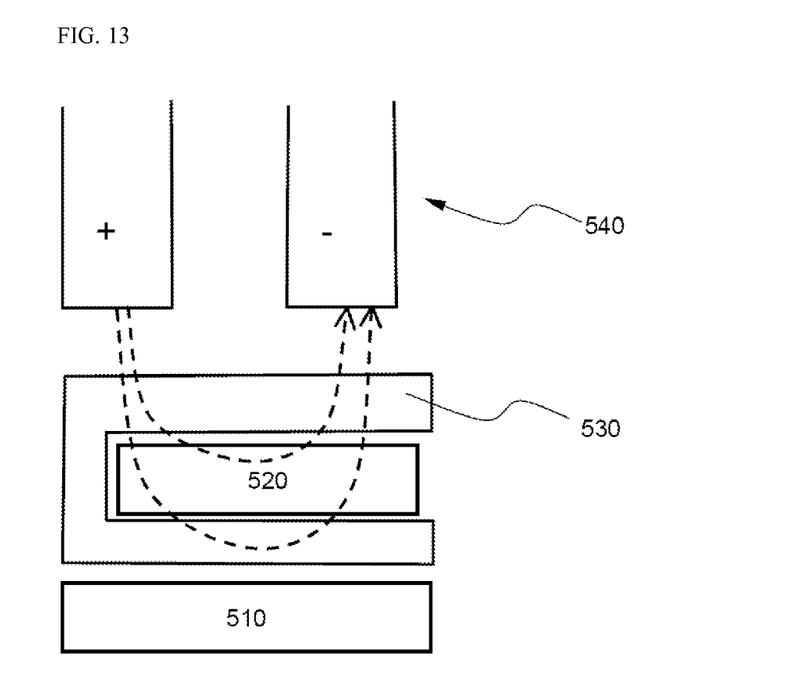
FIG. 13 is a typical view showing a resistance welding structure according to the present invention.

FIG. 13 is a typical view showing a resistance welding structure according to an embodiment of the present invention.

Referring to FIG. 13, when a nickel plate 530 of a protection circuit module 510 and an aluminum terminal 520 of a battery cell (not shown) are coupled to each other by resistance welding, electric current generated from a resistance welding rod 540 flows from the nickel plate 530, resistance of which is high, to the aluminum terminal 520, resistance of which is low, and then flows back to the nickel plate 530. At this time, heat is generated from the interface between the aluminum terminal 520 and the nickel plate 530 due to resistance difference therebetween with the result that the resistance welding between the nickel plate 530 and the aluminum terminal 520 is easily achieved.

Figure 14:
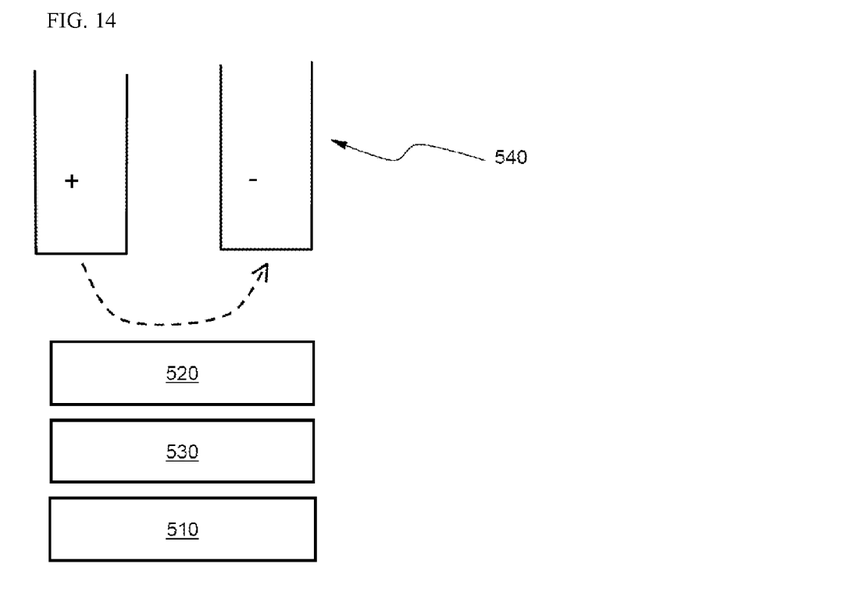
FIG. 14 is a typical view showing a conventional resistance welding structure.

The resistance welding structure according to the embodiment of the present invention is different from a conventional resistance welding structure of FIG. 14.

Referring to FIG. 14, the resistance of the aluminum terminal 520 is lower than that of the nickel plate 530, and therefore, electric current generated from a cathode of the welding rod 540 does not reach the nickel plate 530 but flows to an anode of the welding rod 540 only via the aluminum terminal 520. As a result, the nickel plate 530 of the protection circuit module 510 and the aluminum terminal 520 of the battery cell (not shown) may not be coupled to each other by resistance welding. Even though the nickel plate 530 of the protection circuit module 510 and the aluminum terminal 520 of the battery cell (not shown) are coupled to each other by resistance welding, coupling force based on welding may be low.

Consequently, the nickel plate structure (FIG. 13) according to the present invention solves the problem of the conventional resistance welding structure as shown in FIG. 14.

Figure 15:
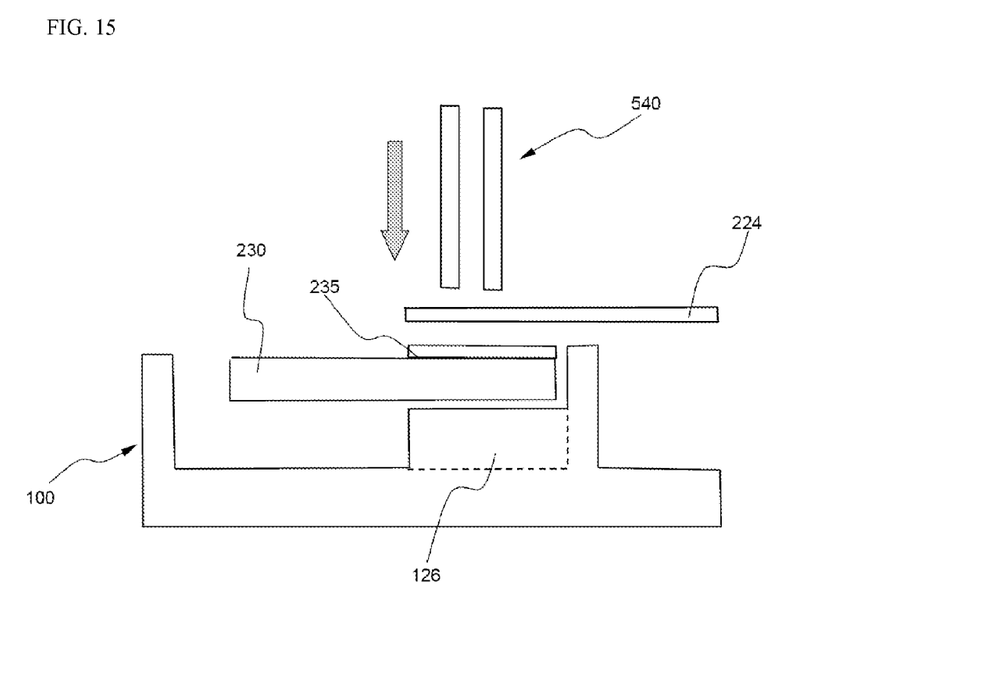
FIG. 15 is a typical view showing a structure of resistance welding with respect to the region A of FIG. 1.

FIG. 15 is a typical view showing a structure of resistance welding with respect to the region A of FIG. 1.

Referring to FIG. 15 together with FIGS. 1 to 3, a support part 126 to support the electrical connection region between the anode terminal 224 of each of the battery cells 220 and the protection circuit module 230 is formed on the lower case 100 in the shape of an upward protrusion.

Specifically, when the anode terminal 224 of each of the battery cells 220 and the connection terminal 235 of the protection circuit module 230 are coupled to each other by resistance welding, the protection circuit module 230 may not endure pressure of the resistance welding rod 540 if the support part 126 is not formed on the lower case 100 in the shape of an upward protrusion with the result that the protection circuit module 230 may be bent. In this case, therefore, it is necessary to couple the connection terminal 235 of the protection circuit module 230 and the anode terminal 224 of each of the battery cells 220 to each other using a resistance welding jig and to mount the connection terminal 235 of the protection circuit module 230 and the anode terminal 224 of each of the battery cells 220, which are coupled to each other by resistance welding, on the lower case 100. As a result, the number of processes is increased.

In the structure of FIG. 1 in which the lower case 100 includes a support part 126 formed in the shape of an upward protrusion, on the other hand, the support part 126 endures pressure of the resistance welding rod 540 generated when the anode terminal 224 of each of the battery cells 220 and the connection terminal 235 of the protection circuit module 230 are coupled to each other by resistance welding. Consequently, the battery cells 220 and the protection circuit module 230 are mounted on the lower case 100, and then the anode terminal 224 of each of the battery cells 220 and the connection terminal 235 of the protection circuit module 230 are directly coupled to each other by resistance welding, thereby solving the above problem.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A pack case for battery packs in which a battery cell array comprising two or more battery cells arranged in a lateral direction and a protection circuit module (PCM) comprising a protection circuit to control an operation of the battery pack are mounted, the pack case comprising:
    a lower case, on which the battery cell array and the protection circuit module are mounted; and
    an upper case disposed above the lower case so that the upper case covers the lower case to fix the battery cell array and the protection circuit module in place,
    wherein the lower case is partitioned into a battery cell mounting part, on which the battery cells are mounted, and a protection circuit module mounting part, on which the protection circuit module is mounted,
    wherein the protection circuit module mounting part is provided with an external input and output terminal mounting part, in which an external input and output terminal to input electric current to the battery pack, to output electric current from the battery pack, and to transmit and receive information to and from the battery pack is mounted,
    wherein an external input and output terminal opening having a size corresponding to the external input and output terminal is formed at a portion of a front of the upper case so that the external input and output terminal is exposed upward,
    a partition wall is formed at an interface between the battery cell mounting part and the protection circuit module mounting part, and openings, through which electrode terminals of the battery cells are exposed toward the protection circuit module, are formed at portions of the partition wall corresponding to electrical connection regions between the electrode terminals of the battery cells and the protection circuit module,
    wherein the protection circuit module mounting part comprises a support part to support the electrical connection region between each of the electrode terminals of the battery cells and the protection circuit module,
    wherein the support part is formed on the lower case in the shape of an upward protrusion, and
    wherein the support part is formed in the shape of a cross type protrusion, a straight protrusion, two parallel protrusions, or a cylindrical boss type protrusion.

2. The pack case according to claim 1, wherein the partition wall has a height to isolate the battery cell mounting part and the protection circuit module from each other.

3. A battery pack comprising a pack case according to claim 1, a battery cell array comprising two or more battery cells arranged in a lateral direction, and a protection circuit module (PCM) comprising a protection circuit to control an operation of the battery pack,
    the pack case comprising:
    a lower case, on which the battery cell array and the protection circuit module are mounted; and
    an upper case disposed above the lower case so that the upper case covers the lower case to fix the battery cell array and the protection circuit module in place,
    wherein the lower case is partitioned into a battery cell mounting part, on which the battery cells are mounted, a protection circuit module mounting part, on which the protection circuit module is mounted,
    a partition wall is formed at an interface between the battery cell mounting part and the protection circuit module mounting part, and openings, through which electrode terminals of the battery cells are exposed toward the protection circuit module, are formed at portions of the partition wall corresponding to electrical connection regions between the electrode terminals of the battery cells and the protection circuit module, and
    wherein an electrical connection region between a cathode terminal of each of the battery cells and the protection circuit module is welded to have a structure in which a conductive plate attached to each connection terminal of the protection circuit module surrounds the cathode terminal of each of the battery cells.

4. The battery pack according to claim 3, wherein the conductive plate comprises a first connection part attached to each connection terminal of the protection circuit module and a second connection part attached to a top of the cathode terminal of each of the battery cells.

5. The battery pack according to claim 3, wherein the conductive plate is a nickel plate, and the cathode terminal of each of the battery cells is an aluminum terminal.

6. The battery pack according to claim 3, wherein the protection circuit module comprises connection terminals connected to electrode terminals of the battery cells by resistance welding, metal plates to electrically connect the battery cells to each other, and a protection circuit to control the operation of the battery pack.

7. The battery pack according to claim 6, wherein the metal plates to electrically connect the battery cells to each other are formed at a top of the protection circuit module.

8. A laptop computer comprising a battery pack according to claim 3 as a power source.

* * * * *